United States Patent
Ohm (10) Patent No.: US 12,021,276 B2
(45) Date of Patent: Jun. 25, 2024

(54) FUEL CELL SYSTEM AND FUEL CELL VEHICLE USING THE SAME

(71) Applicants: Hyundai Motor Company, Seoul (KR); Kia Corporation, Seoul (KR)

(72) Inventor: Ki Wook Ohm, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 372 days.

(21) Appl. No.: 17/565,822

(22) Filed: Dec. 30, 2021

(65) Prior Publication Data

US 2022/0384823 A1 Dec. 1, 2022

(30) Foreign Application Priority Data

May 31, 2021 (KR) ........................ 10-2021-0069773

(51) Int. Cl.
*H01M 8/04014* (2016.01)
*H01M 8/2465* (2016.01)

(52) U.S. Cl.
CPC ..... *H01M 8/04014* (2013.01); *H01M 8/2465* (2013.01); *H01M 2250/20* (2013.01)

(58) Field of Classification Search
CPC ........... H01M 8/04014; H01M 8/2465; H01M 2250/20; H01M 8/04074; H01M 8/2475; H01M 8/04067; H01M 8/0662; H01M 8/2484
See application file for complete search history.

(56) References Cited

U.S. PATENT DOCUMENTS

| | | | |
|---|---|---|---|
| 2013/0241493 A1* | 9/2013 | Kosaki | H01M 10/6563 320/128 |
| 2016/0268612 A1* | 9/2016 | Ushiyama | H01M 8/0494 |
| 2017/0069923 A1* | 3/2017 | Trevisan | H01M 8/0687 |
| 2020/0388872 A1* | 12/2020 | Itou | H01M 8/0491 |

FOREIGN PATENT DOCUMENTS

JP 5513003 B2 6/2014
JP 2016110723 A 6/2016

* cited by examiner

*Primary Examiner* — Stewart A Fraser
(74) *Attorney, Agent, or Firm* — Slater Matsil, LLP

(57) ABSTRACT

An embodiment fuel cell system includes a fuel cell enclosure configured to output electrical energy generated by a fuel cell stack through a stack bus bar, a high-voltage box disposed on the fuel cell enclosure, the high-voltage box including an air inlet port formed at one side thereof, the air inlet port being configured to introduce cold air from outside, and a terminal block assembly including a vent port connected to the fuel cell enclosure, the vent port being configured to deliver the cold air introduced through the air inlet port to the stack bus bar.

20 Claims, 9 Drawing Sheets

FUEL CELL SYSTEM AND FUEL CELL VEHICLE USING THE SAME

CROSS-REFERENCE TO RELATED APPLICATIONS

This application claims the benefit of Korean Patent Application No. 10-2021-006973, filed on May 31, 2021, which application is hereby incorporated herein by reference.

TECHNICAL FIELD

The present invention relates to a fuel cell system and a fuel cell vehicle using the same.

BACKGROUND

A fuel cell broadly includes an electrode, in which an electrochemical reaction occurs, an electrolyte membrane, which delivers hydrogen ions generated by the electrochemical reaction, and a separator, which supports the electrode and the electrolyte membrane. Among fuel cells, a polymer electrolyte membrane fuel cell has a high current density, a high output density, and a short start-up time, thus exhibiting excellent efficiency compared to other types of fuel cells. The polymer electrolyte membrane fuel cell is an environmentally friendly power source, which discharges only pure water as emissions, and thus research thereon for application to the automobile industry has been extensively conducted worldwide.

The polymer electrolyte membrane fuel cell generates electrical energy while generating water and heat through an electrochemical reaction between hydrogen and oxygen. In the polymer electrolyte membrane fuel cell, the hydrogen supplied thereto is split into hydrogen ions and electrons at a catalyst of an anode. Then, the hydrogen ions cross over to a cathode through an electrolyte membrane. At this time, the hydrogen ions are combined with supplied oxygen and electrons introduced through external wires, with the result that electrical energy is generated while water is produced.

A fuel cell used for a vehicle requires a high potential. In order to obtain a higher potential, individual unit cells are stacked to obtain the required potential, and the stacked structure of unit cells is referred to as a stack.

A fuel cell stack is mounted in a vehicle and generates power to drive a driving motor. Hydrogen, air, and coolant need to be continuously circulated. The power generated by the fuel cell stack needs to be safely extracted and used.

Since the fuel cell stack is mounted in a vehicle, it is necessary to ensure a structurally stable and steady state in order to improve the loadability thereof in the vehicle. It is necessary to prevent the power generated by the fuel cell stack from leaking in an undesirable state in order to avoid posing a risk to the vehicle. Moreover, since hydrogen is circulated, it is necessary to prevent explosions due to leakage of the hydrogen.

In general, a fuel cell system has a ventilation structure in which vapor and product water, which are generated inside a fuel cell enclosure during an electrochemical reaction, and leaking gas are discharged to the outside using the negative pressure of an air compressor. At the time of low-temperature cold start and ambient-temperature operation, because the temperature of the vent air in the stack is low, the vent efficiency of the stack may be deteriorated in a low-current section or in an idle state of 4000 RPM or less. Thereby, moisture may remain inside the fuel cell enclosure. In this case, there is a problem in that current flows through the stack and thus the durability of the fuel cell stack is deteriorated due to insulation resistance. Moreover, because a large amount of heat is generated in the stack bus bar, through which high-output current flows, it is necessary to increase the cross-sectional area thereof, which is disadvantageous from the aspect of packaging.

SUMMARY

The present invention relates to a fuel cell system and a fuel cell vehicle using the same. Particular embodiments relate to a fuel cell system capable of improving a ventilation function by supplying external cold air to a fuel cell stack bus bar, and to a fuel cell vehicle using the same.

Accordingly, embodiments of the present invention provide a fuel cell system and a fuel cell vehicle using the same that substantially obviate one or more problems due to limitations and disadvantages of the related art.

An embodiment of the present invention provides a fuel cell system capable of improving the durability of a stack bus bar by reducing the temperature of the stack bus bar when the same is in a high-temperature state and a fuel cell vehicle using the fuel cell system.

Another embodiment of the present invention provides a fuel cell system having a vent port shape for directly delivering external cold air to a stack bus bar and a fuel cell vehicle using the fuel cell system.

Still another embodiment of the present invention provides a fuel cell system capable of enhancing a ventilation function due to an increase in temperature using a structure in which a vent gas passes through a high-temperature stack bus bar and a fuel cell vehicle using the fuel cell system.

However, the embodiments of the present invention are not limited to the above-mentioned embodiments, and other embodiments not mentioned herein will be clearly understood by those skilled in the art from the following description.

A fuel cell system according to embodiments of the present invention for accomplishing the above and other features includes a terminal block body and a vent port that are integrally formed with each other.

A fuel cell system according to embodiments of the present invention may include a fuel cell enclosure configured to output electrical energy generated by a fuel cell stack through a stack bus bar, a high-voltage box disposed on the fuel cell enclosure, the high-voltage box including an air inlet port formed at one side thereof to introduce air from the outside, and a terminal block assembly including at least one vent port connected to the fuel cell enclosure to deliver cold air introduced through the air inlet port to the stack bus bar.

In the fuel cell system according to embodiments of the present invention, the terminal block assembly may include a terminal block body coupled to the fuel cell enclosure and a terminal block cover disposed on the terminal block body.

In the fuel cell system according to embodiments of the present invention, the terminal block assembly may be configured such that the terminal block body and the terminal block cover are integrally formed with each other.

In the fuel cell system according to embodiments of the present invention, the terminal block cover may be bolted to the terminal block body.

In the fuel cell system according to embodiments of the present invention, the at least one vent port may be disposed at the center of the terminal block cover.

In the fuel cell system according to embodiments of the present invention, the at least one vent port may include a plurality of vent ports, and the plurality of vent ports may be disposed at both sides of the upper portion of the terminal block cover.

In the fuel cell system according to embodiments of the present invention, the terminal block cover may have a through-hole formed in the central portion thereof to allow the terminal block body to be inserted thereinto.

In the fuel cell system according to embodiments of the present invention, a vent filter may be disposed between the at least one vent port and the stack bus bar.

In the fuel cell system according to embodiments of the present invention, a sealing member may be disposed on the upper end of the terminal block cover to secure waterproofness and dustproofness between the terminal block cover and the high-voltage box.

In the fuel cell system according to embodiments of the present invention, the sealing member may be made of a rubber material including silicon or ethylene propylene diene monomer (EPDM).

The fuel cell system according to embodiments of the present invention may include a vent hose connecting the air inlet port to the at least one vent port to deliver cold air to the at least one vent port.

In the fuel cell system according to embodiments of the present invention, the vent hose may include two connection portions connected to the at least one vent port and one connection portion connected to the air inlet port.

In the fuel cell system according to embodiments of the present invention, the fuel cell enclosure may include an air outlet port formed at one side thereof.

In the fuel cell system according to embodiments of the present invention, the air outlet port may be disposed closer to the ground than the air inlet port.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of the invention. In the drawings.

DETAILED DESCRIPTION OF ILLUSTRATIVE EMBODIMENTS

Various exemplary embodiments will now be described more fully with reference to the accompanying drawings, in which only some exemplary embodiments are shown. Specific structural and functional details disclosed herein are merely representative for the purpose of describing exemplary embodiments. The present invention, however, may be embodied in many alternative forms, and should not be construed as being limited to the exemplary embodiments set forth herein.

Accordingly, while exemplary embodiments of the invention are capable of being variously modified and taking alternative forms, embodiments thereof are shown by way of example in the drawings and will herein be described in detail. It should be understood, however, that there is no intent to limit the present invention to the particular exemplary embodiments disclosed. On the contrary, exemplary embodiments are to cover all modifications, equivalents, and alternatives falling within the scope of the invention.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g. "between" versus "directly between", "adjacent" versus "directly adjacent", etc.).

The terminology used herein is for the purpose of describing particular embodiments only and is not intended to be limiting of exemplary embodiments of the invention. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, the configuration and operation of a fuel cell system according to embodiments of the present invention will be described with reference to the accompanying drawings.

Figure 1:
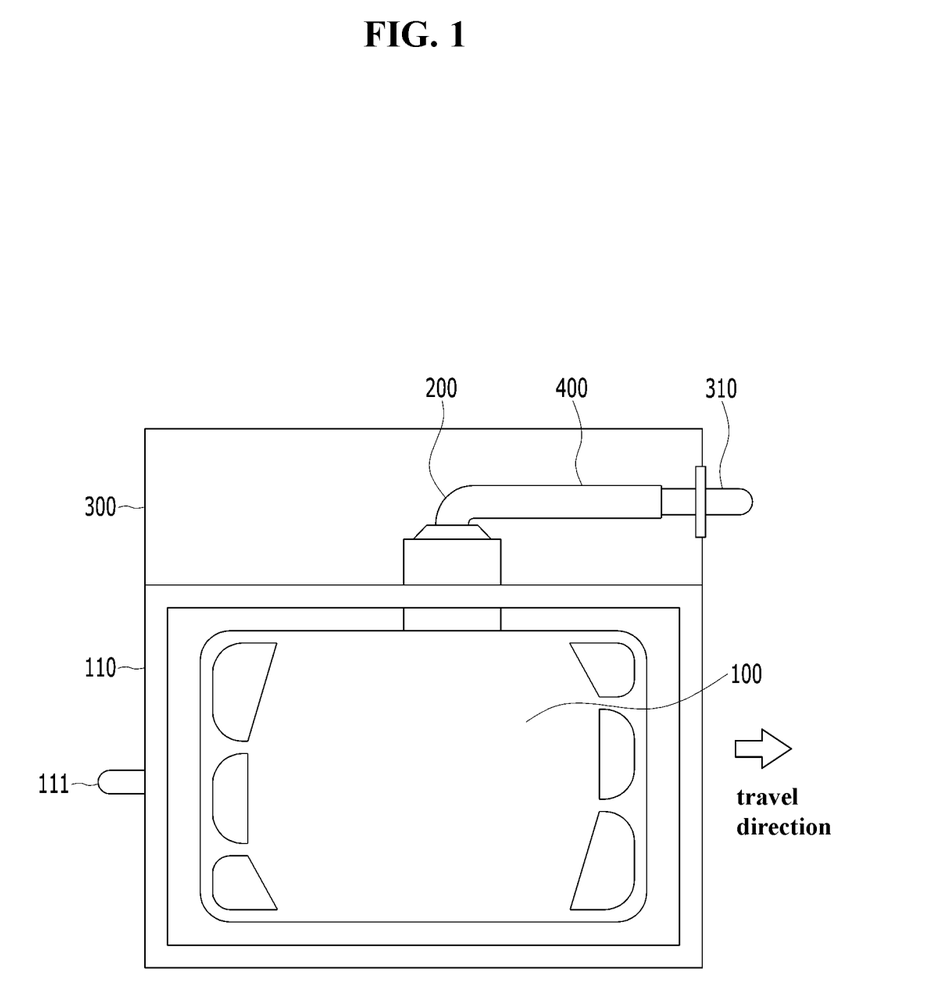
FIG. 1 is a cross-sectional view schematically showing the configuration of a fuel cell system according to an embodiment of the present invention.

FIG. 1 is a cross-sectional view schematically showing the configuration of a fuel cell system according to an embodiment of the present invention. As illustrated, the fuel cell system according to an embodiment of the present invention includes a fuel cell enclosure 110 surrounding a fuel cell stack 100, a terminal block assembly 200 connected to an upper portion of the fuel cell enclosure 110, and a high-voltage box 300 disposed on the fuel cell enclosure 110 while surrounding the terminal block assembly 200.

External cold air introduced through an air inlet port 310, which is formed at one side of the high-voltage box 300, may be delivered to the terminal block assembly 200 via a vent hose 400. This is merely given as an embodiment. External cold air introduced into the air inlet port 310 may be directly delivered to the terminal block assembly 200 without the vent hose 400.

An air outlet port 111 is disposed at one side of the fuel cell enclosure 110. The air outlet port 111 is disposed outside the fuel cell enclosure 110 so as to face the direction opposite the direction in which a vehicle travels, and the air in the fuel cell enclosure 110 is discharged to the outside through the air outlet port 111.

In this embodiment, the air inlet port 310 is disposed so as to face the direction in which the vehicle travels, and the air outlet port 111 is disposed at the fuel cell enclosure 110 so as to face the direction opposite the direction in which the vehicle travels. However, this is merely given as an example for optimizing the flow of fluid, and the present invention is not limited thereto. Of course, the positions of the air inlet port 310 and the air outlet port 111 may be changed.

The lower end portion of the terminal block assembly 200 is connected to the upper end portion of the fuel cell stack 100. The upper end portion of the terminal block assembly 200 is disposed inside the high-voltage box 300.

The air inlet port 310 is disposed outside the high-voltage box 300. External cold air is introduced into the air inlet port 310.

Figure 2:
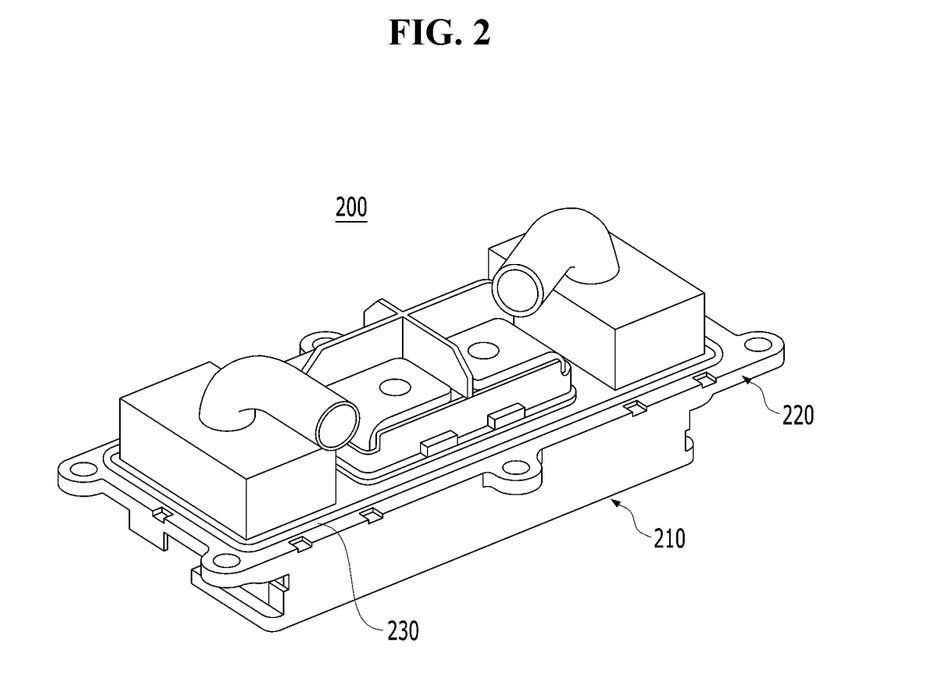
FIG. 2 is a perspective view showing the external appearance of a terminal block assembly in a fuel cell system according to an embodiment of the present invention.

FIG. 2 is a perspective view showing the external appearance of the terminal block assembly in a fuel cell system according to an embodiment of the present invention. As illustrated, the terminal block assembly 200 of the fuel cell system according to an embodiment of the present invention includes a terminal block body 210 and a terminal block cover 220.

A portion of the terminal block body 210 is inserted into the fuel cell enclosure 110 and is connected to the upper portion of the fuel cell stack 100. The terminal block cover 220 is coupled to the upper portion of the terminal block body 210 using a fastening means such as a bolt. In the embodiment shown in FIGS. 2 to 4, the terminal block body 210 and the terminal block cover 220 are provided separately from each other. However, this is merely given as an example, and the present invention is not limited thereto. The terminal block body 210 and the terminal block cover 220 may be integrally formed with each other.

A sealing member 230 is disposed on the terminal block cover 220 in order to secure waterproofness and dust proofing between the terminal block cover 220 and the high-voltage box 300. The sealing member 230 may be made of a rubber material including silicon or ethylene propylene diene monomer (EPDM). Although not illustrated, the terminal block cover 220 may have a receiving groove formed in the upper surface thereof to receive a portion of the sealing member 230 inserted thereinto. Although the sealing member 230 is illustrated in the drawings as having a rectangular shape, the shape thereof may be changed according to the shape of the terminal block cover 220.

Figure 3:
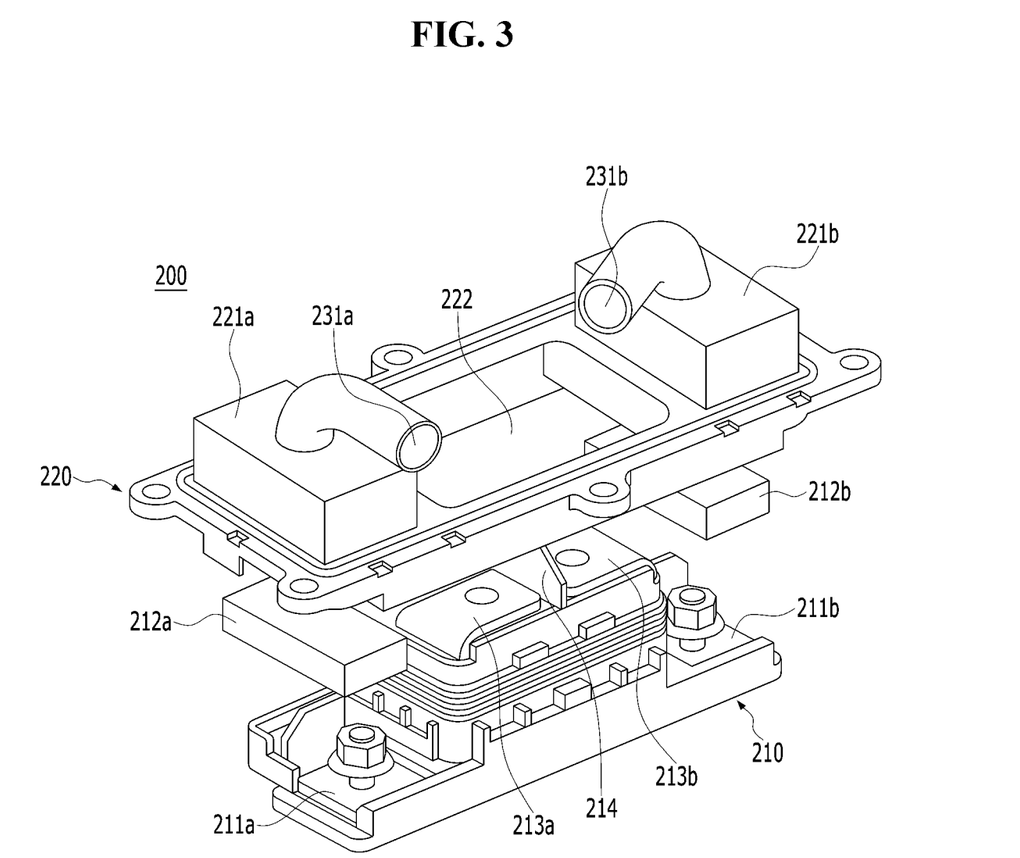
FIG. 3 is an exploded perspective view of the terminal block assembly in the fuel cell system according to an embodiment of the present invention.

FIG. 3 is an exploded perspective view of the terminal block assembly in the fuel cell system according to an embodiment of the present invention. As illustrated, the terminal block assembly 200 includes a terminal block body 210 and a terminal block cover 220 disposed thereon.

The terminal block body 210 is connected to the upper portion of the fuel cell enclosure, and implements a function of delivering electricity supplied through the stack bus bar to the high-voltage box. The terminal block cover 220 is provided with a pair of vent ports 221a and 221b, and is coupled to the terminal block body 210 so as to deliver air introduced from the outside to the fuel cell stack bus bar.

A terminal block terminal unit having the shape of a substantially rectangular parallelepiped is disposed in the central portion of the terminal block body 210. The terminal block terminal unit includes two terminal block terminals 213a and 213b for transmitting opposite poles of a high voltage to the high-voltage box 300. The two terminal block terminals 213a and 213b are separated from each other by a partition wall 214 protruding therebetween. Stack bus bar connection parts 211a and 211b are respectively disposed at the lower end portions of the side surfaces of the terminal block terminals 213a and 213b in order to connect a pair of stack bus bars, composed of a (+) stack bus bar and a (−) stack bus bar, to the terminal block body 210.

Each of the fuel cell stack 100 and the high-voltage box 300, which are mounted in the vehicle, is individually produced through modular design. Therefore, the high-voltage box 300 requires an electrical connection means in order to receive current from the fuel cell stack 100. To this end, a metallic bus bar is disposed between the fuel cell stack 100 and the high-voltage box 300. The reason for this is that a general cable (wire) is not capable of accommodating high current. The stack bus bar is a conductor bar through which current can flow. The stack bus bar corresponds to an intermediate connection medium for transferring high current from the fuel cell stack 100 to the high-voltage box 300. Due to the characteristics thereof, the stack bus bar is preferably formed of a material such as copper, which has excellent electrical conductivity, and the surface thereof may be plated with tin or the like. The allowable current of the stack bus bar may be, for example, direct current of 300 amperes. However, the present invention is not limited thereto, and the material and shape of the stack bus bar may be changed depending on a design, and accordingly, the value of the allowable current may be increased or decreased.

The terminal block cover 220 may be coupled to the upper portion of the terminal block body 210 using a bolt fastening method. The terminal block cover 220 is provided on both sides of the upper surface thereof with vent ports 221a and 221b. Each of the vent ports 221a and 221b is formed in a shape having a cavity therein. Vent filters 212a and 212b are respectively inserted into the inner spaces in the vent ports 221a and 221b. The vent filters 212a and 212b are respectively disposed on the stack bus bar connection parts 211a and 211b.

Each of the vent ports 221a and 221b is disposed so as to overlap a respective one of the stack bus bar connection parts 211a and 211b. Vent hose connection parts 231a and 231b are respectively formed at the upper portions of the vent ports 221a and 221b in order to introduce air from the outside. The vent hose connection parts 231a and 231b are connected to the vent hose 400 to deliver the air introduced from the outside to the vent ports 221a and 221b, respectively. The terminal block cover 220 has a through-hole 222 formed in the central portion thereof to allow the terminal block body 210 to be inserted thereinto and coupled to the terminal block cover 220. The terminal block terminal unit is inserted into the through-hole 222, and thus the vent ports 221a and 221b are disposed on both sides of the terminal block terminal unit.

When external cold air is introduced through the vent ports 221a and 221b, the vent filters 212a and 212b remove fine dust and metallic materials included in the external cold air in order to purify the external cold air. The purified air is transferred to the upper portions of the stack bus bar connection parts 211a and 211b to lower the temperatures of the stack bus bar connection parts 211a and 211b, and then enters the fuel cell enclosure 110.

Figure 4:
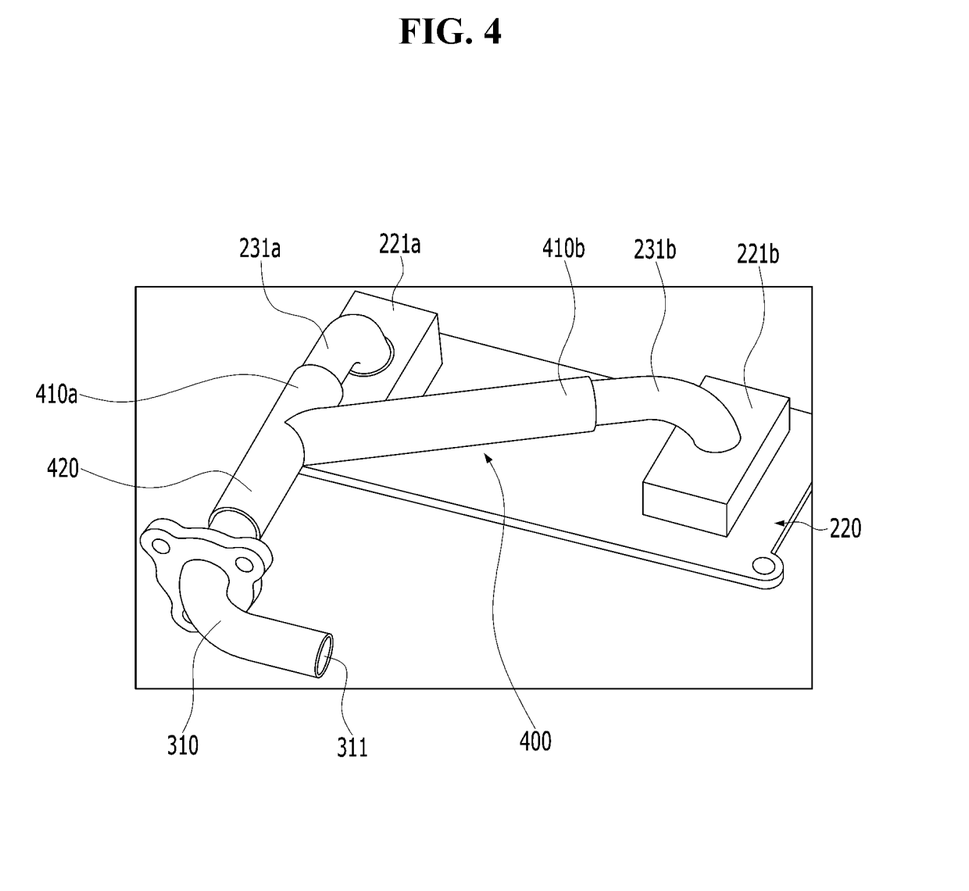
FIG. 4 is an exemplary view showing the configuration in which a vent hose is disposed between vent ports and an air inlet port to connect the same in the fuel cell system according to an embodiment of the present invention.

FIG. 4 is an exemplary view showing the configuration in which the vent hose is disposed between the vent ports and the air inlet port to connect the same in the fuel cell system according to an embodiment of the present invention. The air inlet port 310 is disposed outside the high-voltage box 300 so as to face the direction in which the vehicle travels, and introduces external cold air thereinto. The vent hose 400 delivers the air introduced into the air inlet port 310 to the vent ports 221a and 221b. To this end, the vent hose 400 has an approximate "Y" shape having one inlet and two outlets. The vent hose 400 includes one air inlet port connection portion 420, which is connected to the air inlet port 310, and vent port connection portions 410a and 410b, which are respectively connected to the vent hose connection parts 231a and 231b of the vent ports 221a and 221b.

Figure 5:
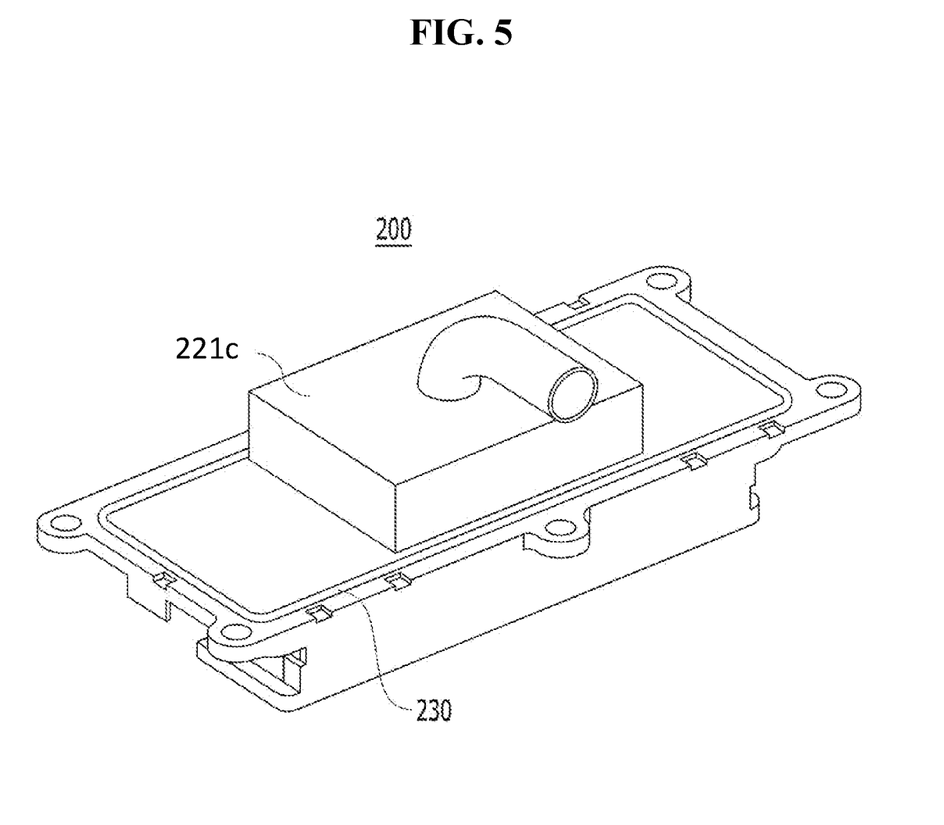
FIG. 5 is a perspective view showing the external appearance of a terminal block assembly in a fuel cell system according to another embodiment of the present invention.
Figure 6:
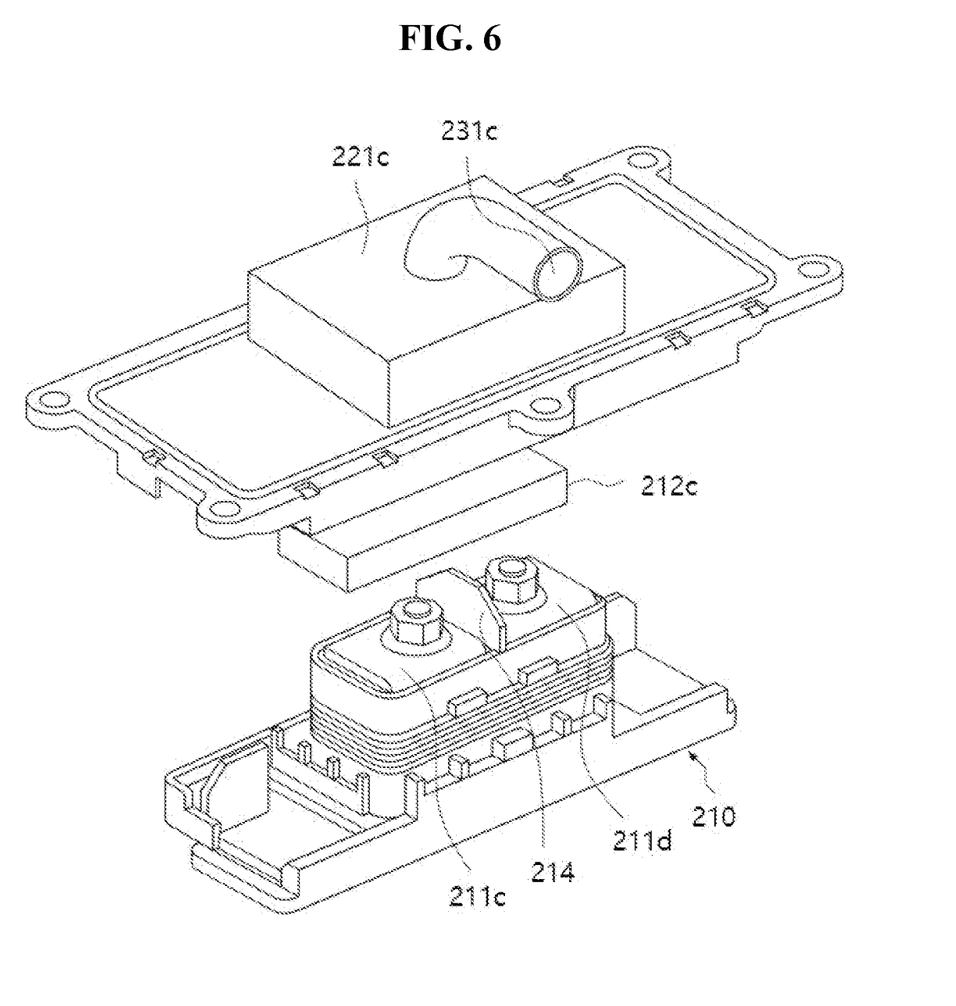
FIG. 6 is an exploded perspective view of the terminal block assembly in the fuel cell system according to another embodiment of the present invention.
Figure 7:
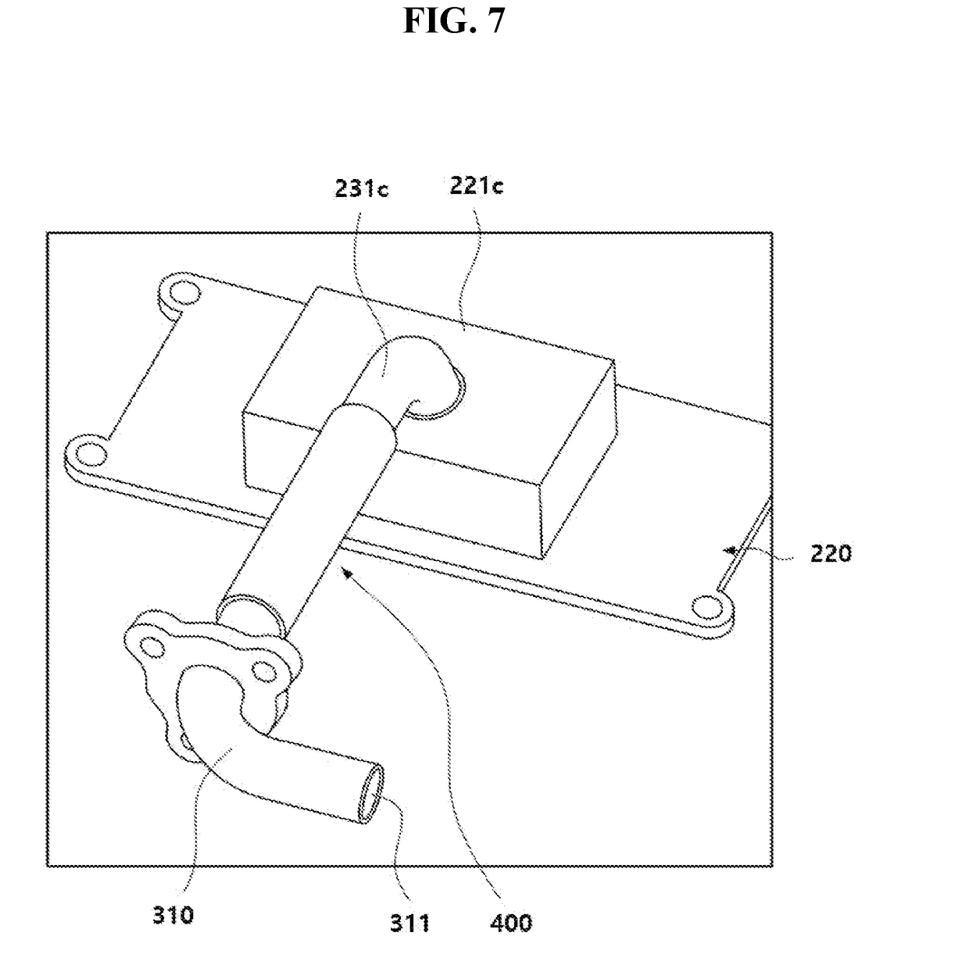
FIG. 7 is an exemplary view showing the configuration in which a vent hose is disposed between a vent port and an air inlet port to connect the same in the fuel cell system according to another embodiment of the present invention.

FIGS. 5 to 7 are exemplary views showing the configuration of a terminal block assembly in a fuel cell system according to another embodiment of the present invention. Unlike the above-described embodiment, in which the (+) and (−) stack bus bar connection parts 211a and 211b are disposed so as to be oriented in opposite directions, a fuel cell system according to another embodiment is configured such that stack bus bar connection parts 211e and 211d are disposed so as to be oriented in the same direction. Accordingly, a terminal block cover 220, which constitutes the terminal block assembly, may include one vent port 221C. In addition, in the fuel cell system according to this embodiment, one vent filter 212C may be disposed between the upper portions of the stack bus bar connection parts 211e and 211d and the vent port 221C. In this embodiment, unlike the fuel cell system according to the embodiment shown in FIGS. 2 to 4, no through-hole may be formed in the terminal block cover 220.

In the case in which one vent port 221C is provided, a vent hose 400 may be formed straight, as shown in FIG. 7. Alternatively, although not illustrated, no vent hose may be provided, and a vent port connection part 231c and an air inlet port 310 may be directly connected to each other.

Figure 8:
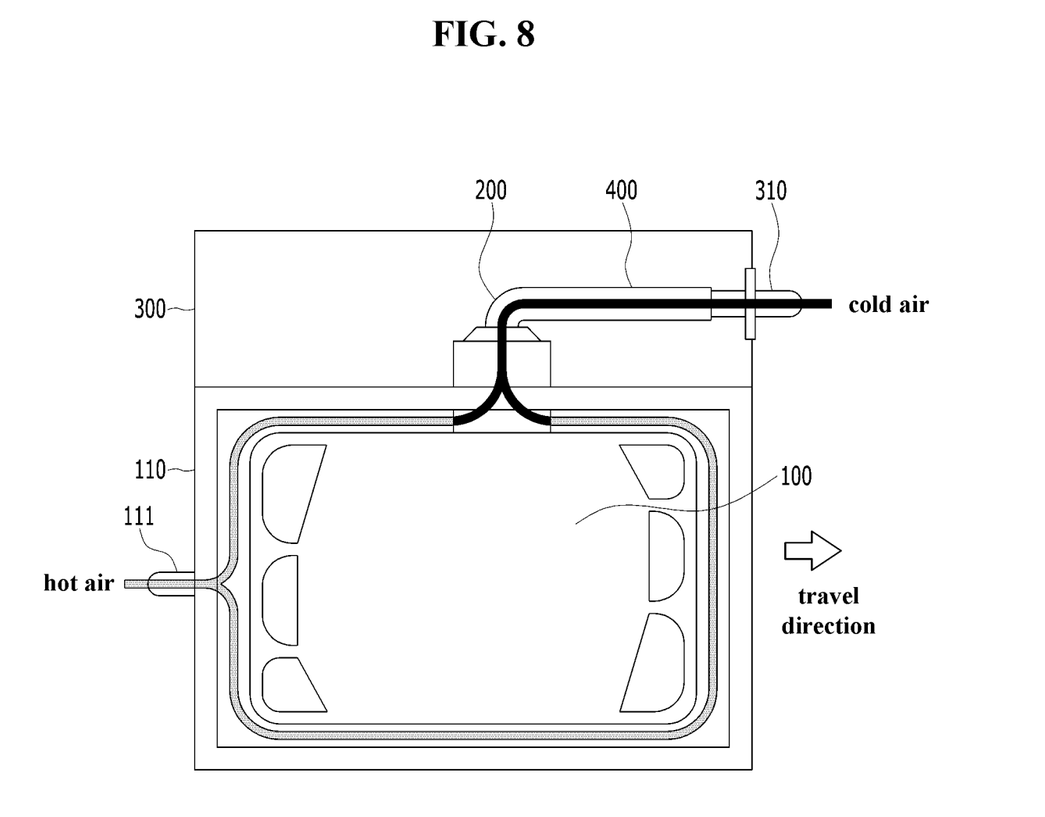
FIG. 8 is an exemplary view showing the ventilation operation in the fuel cell system according to an embodiment of the present invention.

FIG. 8 is an exemplary view showing the ventilation operation in the fuel cell system according to an embodiment of the present invention. External cold air is introduced through the air inlet port 310, which is disposed outside the high-voltage box 300 so as to face the direction in which the vehicle travels. The air introduced from the outside is delivered to one or two vent ports 221a and 221b formed at the terminal block cover 220 via the vent hose 400. The vent filters 212a and 212b, which are respectively inserted into the inner spaces in the vent ports 221a and 221b, may remove foreign substances, dust, heavy metal materials, and the like included in the air introduced from the outside. The air filtered by one or two vent filters 212a and 212b absorbs the heat of the stack bus bar while passing through the stack bus bar connection parts 211a and 211b. Accordingly, the temperature of the stack bus bar is lowered, and the air that has absorbed the heat of the stack bus bar enters the fuel cell enclosure 110. The fuel cell enclosure 110 has an accommodation space formed therein to accommodate the fuel cell stack 100 therein. In order to facilitate dissipation of heat from the stack separator and dilution of hydrogen leaking from the stack with the external cold air, the fuel cell stack 100 is mounted so as to be spaced predetermined distances apart from the inner wall surface of the fuel cell enclosure 110 in all directions. The air that has absorbed the heat of the stack bus bar and is thus increased in temperature enters the space between the inner wall of the fuel cell enclosure no and the fuel cell stack 100. Since the air entering the fuel cell enclosure 110 is clean air, from which contaminants have been removed by the vent filters 212a and 212b, the heat of the separator is easily dissipated to the outside of the separator, and the temperature of the stack is lowered, thus making it possible to improve the operation performance and efficiency of the stack. Negative pressure is generated by the air outlet port 111 disposed on the rear surface of the fuel cell enclosure 110, and thus vapor and product water, which are generated in the fuel cell stack 100, and leaking gas are discharged to the outside of the fuel cell enclosure 110. A negative-pressure generation device such as an air compressor may be connected to the air outlet port 111.

As described above, according to the ventilation structure of the terminal block assembly and the fuel cell system according to embodiments of the present invention, external cold air introduced from the region above the stack bus bar lowers the temperature of the stack bus bar, thereby improving the durability of the stack bus bar. At the same time, the air that has absorbed the heat of the stack bus bar and is thus increased in temperature is used for ventilation of the fuel cell enclosure 110 and is discharged through the air outlet port 111 disposed at the rear end of the fuel cell enclosure 110, and accordingly vapor and product water present in the stack and leaking gas are discharged outside, whereby the ventilation efficiency of the stack is improved.

Figure 9:
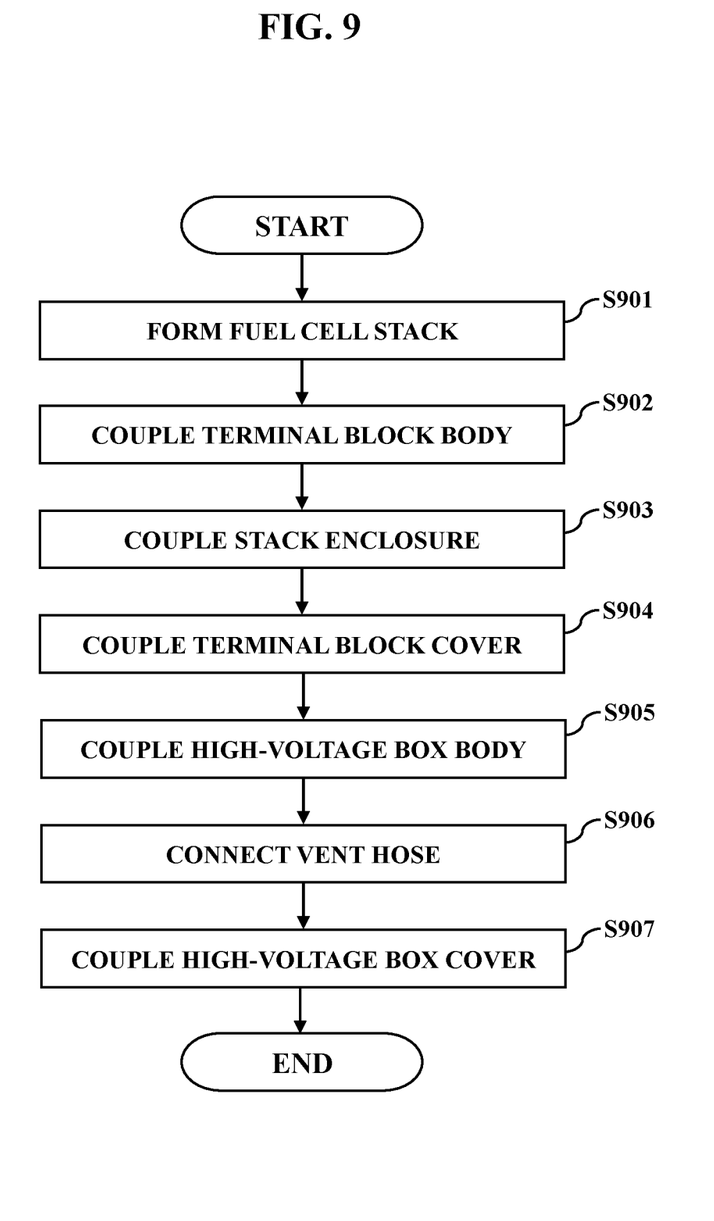
FIG. 9 is a flowchart showing a process of assembling the fuel cell system according to an embodiment of the present invention.

FIG. 9 is a flowchart showing a process of assembling a fuel cell system including a separable terminal block assembly according to an embodiment of the present invention. First, a fuel cell stack 100 is formed (S901), and a terminal block body 210 is coupled to the upper side thereof (S902).

Subsequently, a fuel cell enclosure 110 is coupled to the outer side of the stacked fuel cell stack 100 (S903), and a terminal block cover 220 is coupled to the upper side of the terminal block body 210, which is connected to the upper side of the fuel cell stack 100 (S904).

When the terminal block cover 220 is coupled to the terminal block body 210, which completes the manufacture of the terminal block assembly, a body of a high-voltage box 300 is coupled to the upper side of the fuel cell enclosure 110. At this time, foreign substances are prevented from entering a gap between the terminal block cover 220 and the high-voltage box 300 by a sealing member 230 (S905).

Vent ports 221a and 221b, which are integrally formed with the terminal block cover 220, are connected to an air inlet port 310, which is disposed at the high-voltage box 300, using a vent hose 400 (S906).

Finally, a cover of the high-voltage box 300 is coupled to the body of the high-voltage box 300, thereby completing formation of the ventilation structure of the fuel cell system (S907).

As is apparent from the above description, in the terminal block assembly, the fuel cell system, and the fuel cell vehicle using the same according to embodiments of the present invention, the temperature of the high-temperature stack bus bar is reduced using the vent port structure for directly delivering external cold air to the stack bus bar, whereby the durability of the stack bus bar is improved. In addition, it is possible to enhance a ventilation function due to an increase in temperature using the structure in which a vent gas passes through the high-temperature stack bus bar.

However, the effects achievable through embodiments of the present invention are not limited to the above-mentioned effects, and other effects not mentioned herein will be clearly understood by those skilled in the art from the above description.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel cell system comprising:
   a fuel cell enclosure configured to output electrical energy generated by a fuel cell stack through a stack bus bar;
   a high-voltage box disposed on the fuel cell enclosure, the high-voltage box comprising an air inlet port formed at one side thereof, the air inlet port being configured to introduce cold air from outside; and
   a terminal block assembly comprising a vent port connected to the fuel cell enclosure, the vent port being configured to deliver the cold air introduced through the air inlet port to the stack bus bar.

2. The fuel cell system according to claim 1, wherein the terminal block assembly comprises:
   a terminal block body coupled to the fuel cell enclosure; and
   a terminal block cover disposed on the terminal block body.

3. The fuel cell system according to claim 2, wherein the terminal block cover is coupled to the terminal block body with a bolt connection.

4. The fuel cell system according to claim 3, wherein the vent port is disposed at a center of the terminal block cover.

5. The fuel cell system according to claim 3, wherein the vent port comprises a plurality of vent ports, and the plurality of vent ports are disposed at both sides of an upper portion of the terminal block cover.

6. The fuel cell system according to claim 5, wherein the terminal block cover has a through-hole formed in a central portion thereof, the through-hole being configured to allow the terminal block body to be inserted thereinto.

7. The fuel cell system according to claim 3, wherein a vent filter is disposed between the vent port and the stack bus bar.

8. The fuel cell system according to claim 3, further comprising a sealing member disposed on an upper end of the terminal block cover, the sealing member being configured to secure waterproofness and dust proofing between the terminal block cover and the high-voltage box.

9. The fuel cell system according to claim 8, wherein the sealing member comprises a rubber material including silicon or ethylene propylene diene monomer (EPDM).

10. The fuel cell system according to claim 3, further comprising a vent hose connecting the air inlet port to the vent port, the vent hose being configured to deliver the cold air to the vent port.

11. The fuel cell system according to claim 10, wherein the vent hose comprises a first connection portion connected to the vent port and a second connection portion connected to the air inlet port.

12. The fuel cell system according to claim 1, wherein the fuel cell enclosure comprises an air outlet port formed at one side thereof.

13. The fuel cell system according to claim 12, wherein the air outlet port is disposed closer to a ground than the air inlet port.

14. A fuel cell vehicle using the fuel cell system according to claim 1.

15. A fuel cell system comprising:
   a fuel cell enclosure configured to output electrical energy generated by a fuel cell stack through a stack bus bar;
   a high-voltage box disposed on the fuel cell enclosure, the high-voltage box comprising an air inlet port formed at one side thereof, the air inlet port being configured to introduce cold air from outside; and
   a terminal block assembly comprising:
      a vent port connected to the fuel cell enclosure, the vent port being configured to deliver the cold air introduced through the air inlet port to the stack bus bar;
      a terminal block body coupled to the fuel cell enclosure; and
      a terminal block cover disposed on and integrally formed with the terminal block body.

16. The fuel cell system according to claim 15, wherein the vent port is disposed at a center of the terminal block cover.

17. The fuel cell system according to claim 15, wherein:
   the vent port comprises a plurality of vent ports;
   the plurality of vent ports are disposed at both sides of an upper portion of the terminal block cover; and
   the terminal block cover has a through-hole formed in a central portion thereof, the through-hole being configured to allow the terminal block body to be inserted thereinto.

18. The fuel cell system according to claim 15, wherein a vent filter is disposed between the vent port and the stack bus bar.

19. The fuel cell system according to claim 15, further comprising a sealing member disposed on an upper end of the terminal block cover, the sealing member being configured to secure waterproofness and dust proofing between the terminal block cover and the high-voltage box.

20. The fuel cell system according to claim 15, further comprising a vent hose connecting the air inlet port to the vent port, the vent hose being configured to deliver the cold air to the vent port, and the vent hose comprising a first connection portion connected to the vent port and a second connection portion connected to the air inlet port.

* * * * *